United States Patent
Wu et al.

(10) Patent No.: US 7,593,170 B2
(45) Date of Patent: Sep. 22, 2009

(54) RANDOM NEGATIVE INDEX MATERIAL STRUCTURES IN A THREE-DIMENSIONAL VOLUME

(75) Inventors: Wei Wu, Mountain View, CA (US); Shih-Yuan Wang, Palo Alto, CA (US); Alexandre M. Bratkovski, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 319 days.

(21) Appl. No.: 11/584,320

(22) Filed: Oct. 20, 2006

(65) Prior Publication Data

US 2008/0108000 A1      May 8, 2008

(51) Int. Cl.
    *G02B 13/18*    (2006.01)
    *H01B 3/24*    (2006.01)
(52) U.S. Cl. ..................... 359/719; 252/570
(58) Field of Classification Search .......... 359/719, 359/586; 252/570
    See application file for complete search history.

(56) References Cited

U.S. PATENT DOCUMENTS

| | | | |
|---|---|---|---|
| 6,791,432 B2 | 9/2004 | Smith et al. | |
| 6,859,114 B2 | 2/2005 | Eleftheriades et al. | |
| 6,938,325 B2 | 9/2005 | Tanielian | |
| 7,015,865 B2 | 3/2006 | Isaacs et al. | |
| 2005/0161630 A1 | 7/2005 | Chui et al. | |
| 2006/0125681 A1* | 6/2006 | Smith et al. | 342/120 |
| 2007/0171536 A1* | 7/2007 | Tsukagoshi | 359/642 |
| 2007/0232738 A1* | 10/2007 | Bratkovski et al. | 524/439 |
| 2007/0242360 A1* | 10/2007 | Rachford | 359/586 |
| 2008/0089645 A1* | 4/2008 | Wang et al. | 385/37 |

OTHER PUBLICATIONS

Hsu, Yi-Jang, et al., "Electromagnetic resonance in deformed split ring resonators of left-handed meta-materials," J. Appl. Phys., vol. 96, No. 4, pp. 1979-1982, Aug. 15, 2004.
Iyer, Ashwin K., et al., "Experimental and theoretical verification of focusing in a large, periodically loaded transmission line negative refractive index metamaterial," Optics Express, vol. 11, No. 7, pp. 696-708, Apr. 7, 2003.
Iyer, Ashwin, K., et al., "Negative Refractive Index Metamaterials Supporting 2-D Waves," IEEE, pp. 1067-1070, 2002.

(Continued)

*Primary Examiner*—Jordan M. Schwartz

(57) ABSTRACT

Materials and methods for fabricating and using negative index materials are disclosed. A negative index material comprises a three-dimensional volume including a bulk solution and a plurality of unit cells disposed in the bulk solution in a substantially random pattern. Each unit cell comprises a periodic hole array pattern on a substrate or a resonator formed on a first surface of a substrate, and a thin wire pattern formed on a second surface of the substrate. The combination of the unit cells in the bulk solution produces a negative effective permeability and a negative effective permittivity over a frequency band of interest for the three-dimensional volume. The negative index material may be used to focus radiation by directing an incident radiation at the negative index material and generating a focused radiation by a negative refraction of the incident radiation in the negative index material.

21 Claims, 5 Drawing Sheets

OTHER PUBLICATIONS

Johnson, R. Colin, "Composite metamaterials enable 'perfect lens'," EETimes.com, 5 pages, Sep. 27, 2004.

Katsarakis, N., et al., "Electric coupling to the magnetic resonance of split ring resonators," Appl. Phys. Lett., vol. 84, No. 15, pp. 2943-2945, Apr. 12, 2004.

Krieger, Kim, "Lens Once Deemed Impossible Now Rules the Waves," Science, vol. 303, p. 1597, Mar. 12, 2004.

Markos, P., et al., "Numerical studies of left-handed materials and arrays of split ring resonators," Physical Review E, vol. 65, pp. 036622-1 through 036622-8, Mar. 7, 2002.

Parimi, P.V., et al., "Negative Refraction and Left-Handed Electromagnetism in Microwave Photonic Crystals," Physical Review Letters, vol. 92, No. 12, pp. 127401-1 through 127401-4, Mar. 26, 2004.

Pendry, John, "New electromagnetic materials emphasise the negative," Physics World, pp. 1-5, 2001.

Pendry, John B., et al., "Reversing Light: Negative Refraction," Physics Today, 8 pages, Dec. 2003.

Ramakrishna, S. Anantha, "Physics of negative refractive index materials," Rep. Prog. Phys., vol. 68, pp. 449-521, 2005.

Simovski, Constantin R., et al., "Backward Wave Region and Negative Material Parameters of a Structure Formed by Lattices of Wires and Split-Ring Resonators," IEEE Transactions on Antennas and Propagation, vol. 51, No. 10, pp. 2582-2591, Oct. 2003.

Smith, D.R., et al., "Determination of effective permittivity and permeability of metamaterials from reflection and transmission coefficients," Physical Review B., vol. 65, pp. 195104-1 through 195104-5, 2002.

* cited by examiner

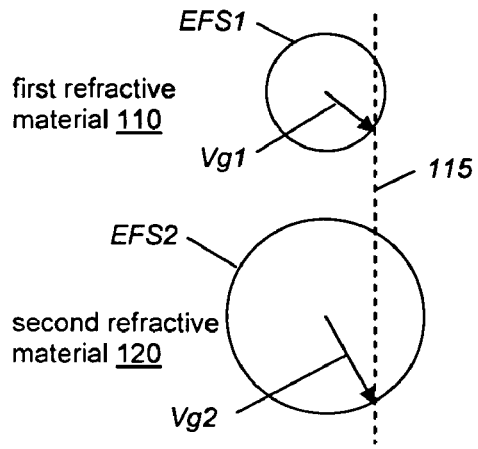
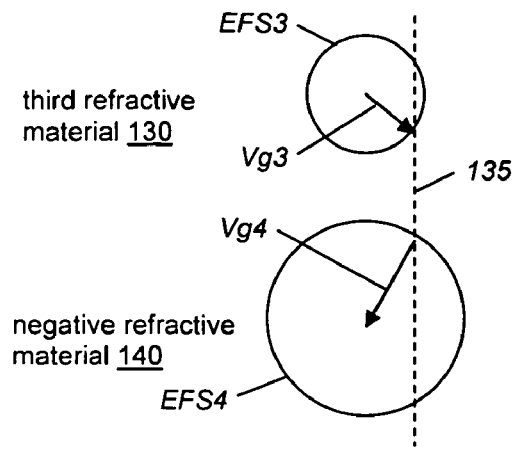
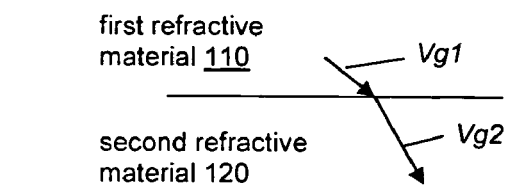
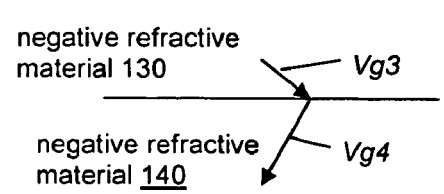
FIG. 1A
FIG. 1B
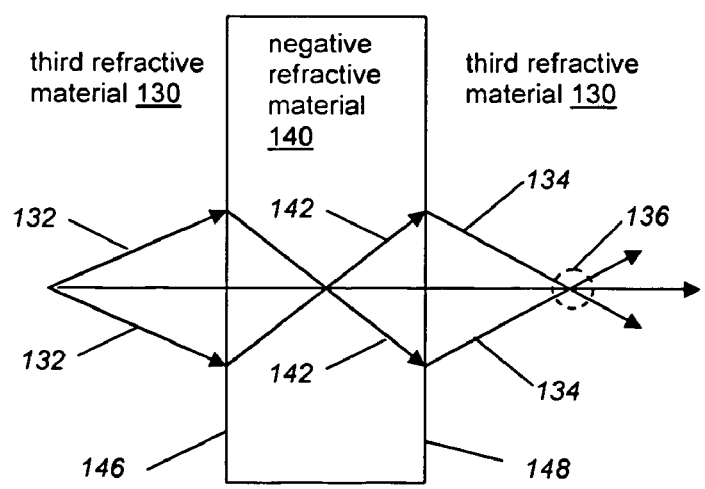
FIG. 2

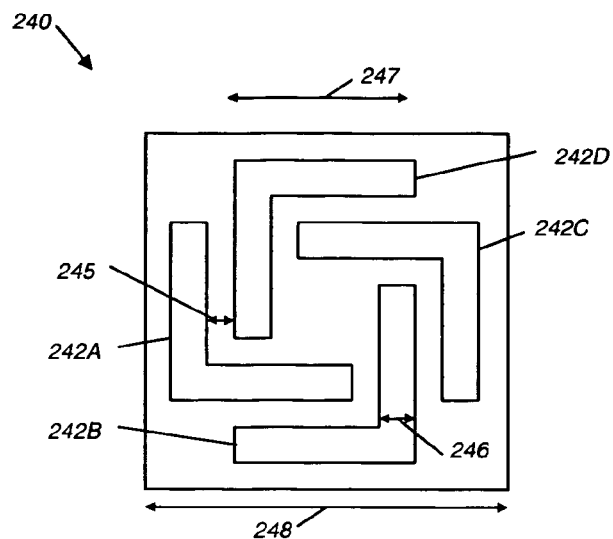
FIG. 3D
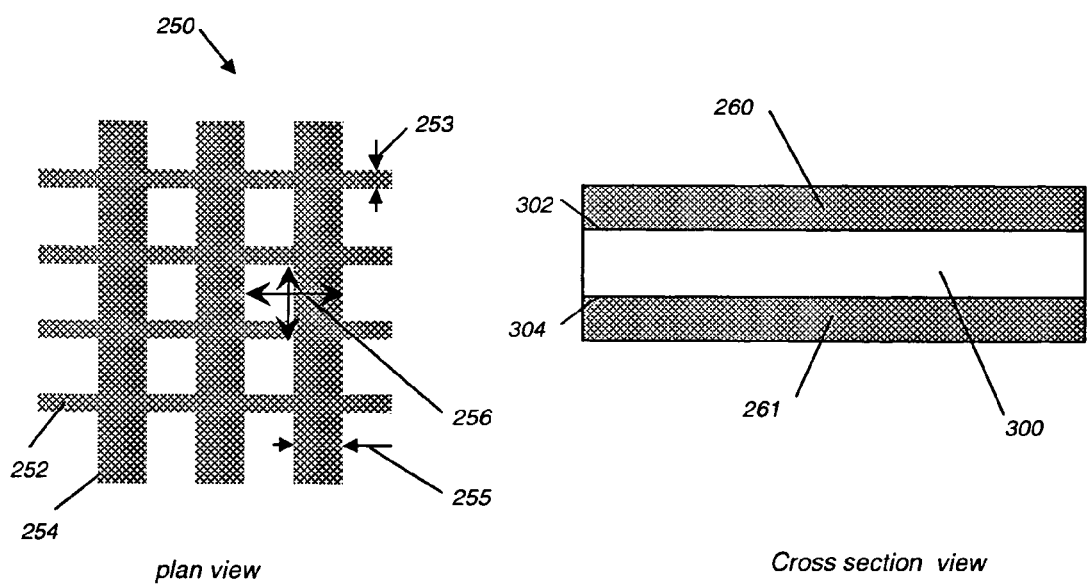
plan view
FIG. 3E
Cross section view
FIG. 3F

RANDOM NEGATIVE INDEX MATERIAL STRUCTURES IN A THREE-DIMENSIONAL VOLUME

FIELD OF THE INVENTION

The present invention relates to electromagnetic materials, and more specifically, to electromagnetic meta-materials exhibiting negative index of refraction characteristics.

BACKGROUND OF THE INVENTION

When electromagnetic radiation is incident on a medium, the medium is said to respond to the radiation, producing responding fields and currents. This response is generally determined by the composition, structure, and geometry of the medium. The response may, in general, be quite complicated due to a collection of either homogenous or heterogeneous scattering entities within the medium. However, when the dimensions and spacing of these individual scattering elements comprising the medium are less than the wavelength of the incident radiation, the responding fields and currents can be considered as macroscopic averages, and the medium treated as if it is relatively continuous.

Media typically found in nature or that can be formed by known chemical synthesis, referred to herein as naturally occurring media, generally exhibit a broad, but limited, range of response to electromagnetic radiation. These materials are often referred to as right-handed materials or positive index materials because they exhibit positive values for both electric permittivity and magnetic permeability.

However, some man made materials, often referred to as left-handed materials, meta-materials, or negative index materials, exhibit negative values for both electric permittivity and magnetic permeability. Negative magnetic permeability is not observed in natural materials, especially at frequencies approaching visible range. It however, may exist in meta-materials as a result of collective motion of large number of electrons in response to an incident radiation field. With negative electric permittivity and magnetic permeability, a meta-material may exhibit a refractive index that is negative, thus the name negative index materials. Conversely, naturally occurring media generally exhibit a positive refractive index.

Meta-materials exhibiting a negative refractive index may be useful in new and different ways for modifying electromagnetic radiation in areas such as focusing, transmission, and amplification. Meta-materials comprising a composite media, including a periodic array of conducting elements that behave substantially as a continuous media and exhibit negative refractive properties over a frequency band of interest, have been proposed. However, these proposals have generally been limited to materials that may be fabricated as two dimensional arrays, with multiple two-dimensional arrays being arranged in a pattern to create a three-dimensional structure for the meta-material. This process of arranging two-dimensional arrays and creating three-dimensional structures can be difficult, costly, and often unsuccessful.

Accordingly, there is a need for a more easily fabricated meta-material that exhibits negative refractive properties and which may be more easily fabricated in a three-dimensional volume.

BRIEF SUMMARY OF THE INVENTION

The present invention, in a number of embodiments provides more easily fabricated meta-materials that exhibit negative refractive properties by using a composite media comprising a random arrangement of conducting elements.

An embodiment of the present invention includes a method of forming a negative index material comprising supplying a substrate, forming unit cells on the substrate, singulating the unit cells, and disposing the unit cells into a three-dimensional volume including a bulk solution. Each unit cell comprises a resonator formed on a first surface of the substrate and a thin wire pattern formed on a second surface of the substrate. The act of disposing the unit cells into the bulk solution further comprises forming a substantially random pattern of unit cells in the bulk solution wherein the substantially random pattern of unit cells produces a negative effective permeability and a negative effective permittivity over a frequency band of interest for the three-dimensional volume.

Another embodiment of the present invention includes a negative index material comprising a three-dimensional volume including a bulk solution and a plurality of unit cells disposed in the bulk solution in a substantially random pattern. Each unit cell comprises a substrate, a resonator formed on a first surface of the substrate, and a thin wire pattern formed on a second surface of the substrate. The combination of the substantially random pattern of unit cells in the bulk solution produces a negative effective permeability and a negative effective permittivity (analogous to metal-dielectric composites) over a frequency band of interest for the three-dimensional volume.

Another embodiment of the present invention includes a method of focusing radiation comprising providing a negative index material, directing an incident radiation at an incident surface of the negative index material, and generating a focused radiation at a focal location outside the negative index material by a negative refraction of the incident radiation in the negative index material. The negative index material comprises a three-dimensional volume including a bulk solution and a plurality of unit cells disposed in the bulk solution in a substantially random pattern. Each unit cell comprises a substrate, a resonator formed on a first surface of the substrate, and a thin wire pattern formed on a second surface of the substrate. The combination of the substantially random pattern of unit cells in the bulk solution produces a negative effective permeability and a negative effective permittivity over a frequency band of interest for the three-dimensional volume.

The features, advantages, and alternative aspects of the present invention will be apparent to those skilled in the art from a consideration of the following detailed description taken in combination with the accompanying drawings.

BRIEF DESCRIPTION OF THE SEVERAL VIEWS OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

FIG. 1A is a wave-vector diagram illustrating directions of wave propagation at an interface between two isotropic materials;

FIG. 1B is a wave-vector diagram illustrating directions of wave propagation at an interface between an isotropic material and a material exhibiting a negative refractive index;

FIG. 2 illustrates focusing properties of electromagnetic radiation traveling through materials exhibiting a negative refractive index;

FIG. 3D illustrates a L-shaped pattern for a conductive material according to a particular embodiment of the invention;

FIG. 3E illustrates a plan view of a periodic hole array pattern for a conductive material according to a particular embodiment of the invention;

FIG. 3F illustrates cross section view of the periodic hole array pattern of FIG. 3E;

DETAILED DESCRIPTION OF THE INVENTION

Figure 3A:
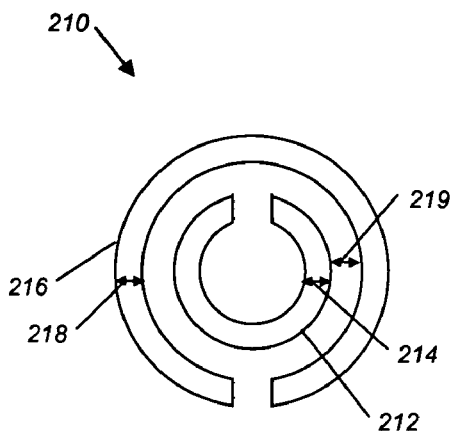
FIG. 3A illustrates a split ring resonator pattern for a conductive material according to a particular embodiment of the invention.

In the following description, micron-scale dimensions refer roughly to dimensions that range from one micrometer up to a few micrometers, sub-micron scale dimensions refer roughly to dimensions that range from 1 micrometer down to 0.05 micrometers, and nanometer scale dimensions refer roughly to dimensions that range from 1 nanometer up to 50 nanometers (0.05 micrometers).

The present invention, in a number of embodiments provides more easily fabricated meta-materials that exhibit negative refractive properties by using a composite media comprising a random arrangement of individual unit cells.

Embodiments of the present invention are configured for providing a meta-material that includes a negative refractive index for radiation having a selected wavelength range. For radiation directed at a negative index material, refraction of the radiation as it passes through the negative index material may refract in a different direction than that of naturally occurring media and may generate a focused radiation or a resonance within a resonant structure of the negative index material.

With regard to refraction, Snell's law is a well-known law that models refraction characteristics of a radiation beam as the radiation beam encounters an interface between two mediums with different refractive properties. Generally, Snell's law states that the product of the refractive index and the sine of the angle of incidence of a radiation beam in one medium is equal to the product of the refractive index and the sine of the angle of refraction in a successive medium.

Naturally occurring materials exhibit a positive refractive index. In other words, a radiation beam with an oblique incident angle to a facet of a medium with a high positive refractive index may be deviated toward the surface normal of the facet, and a radiation beam entering a medium of lower refractive index may be deviated away from the surface normal, but the deviation occurs at a positive angle relative to the surface normal. Recently, a number of man-made materials (often referred to as meta-materials) have been developed that exhibit a negative refractive index. With a negative refractive index, the material still obeys Snell's law, but the radiation beam is deflected in the opposite direction from natural materials (i.e., with a negative angle relative to the surface normal). Thus, using Snell's law, the product of the refractive index and the sine of the angle of incidence of a radiation beam in one medium is equal to the negative of the product of the refractive index and the sine of the angle of refraction in a successive medium. This is readily explained by the fact that in negative index meta-materials the phase velocity is opposite to the direction of the flow of radiation energy (i.e., group velocity). Thus, negative refraction immediately follows from conservation of the wave number along the interface.

The refractive properties of a positive refractive index and a negative refractive index may be understood by referring to FIGS. 1A, 1B, and 2. FIG. 1A is a wave-vector diagram illustrating directions of wave propagation through two refractive materials (110 and 120) and at the interface between the two refractive materials (110 and 120). Similarly, FIG. 1B is a wave-vector diagram illustrating directions of wave propagation at an interface between a third refractive material 130 and a negative refractive material 140.

FIG. 1A illustrates positive refraction. In FIG. 1A, the upper circle illustrates an equal frequency surface EFS1 plot of a first refractive material 110. The lower circle illustrates an equal frequency surface EFS2 plot of a second refractive material 120. EFS2 is a different diameter than EFS1 due, in part, to the difference in dielectric properties between the first refractive material 110 and the second refractive material 120. Group velocity vector Vg1 is oriented perpendicular to, and away from the center of, EFS1 and illustrates the direction of wave propagation through the first refractive material 110. A first frequency line 115 illustrates a specific frequency at which group velocity vector Vg1 intersects EFS1. The first frequency line 115 is carried down to intersect with EFS2. Thus, a group velocity vector Vg2, oriented perpendicular to and away from the center of EFS2, defines the direction of wave propagation through the second refractive material 120 at the same frequency as the wave propagating through the first refractive material 110. The lower portion of FIG. 1A illustrates the two group velocity vectors Vg1 and Vg2 and the direction change that occurs at the boundary between the first refractive medium 110 and the second refractive medium 120. The direction change is due to the difference in the refractive index of the two refractive materials (110 and 120). The positive refraction can be seen by the positive angle from the surface normal for group velocity vector Vg2.

FIG. 1B illustrates negative refraction. In FIG. 1B the upper circle illustrates an equal frequency surface EFS3 plot of a third refractive material 130. The lower circle illustrates an equal frequency surface EFS4 plot of a negative refractive material 140. EFS4 is a different diameter than EFS3 due, in part, to the difference in dielectric properties between the first refractive material 110 and the negative refractive material 140. In addition, in negative refractive index material 140, as the frequency increases, the equal frequency surface EFS4 moves inward around the symmetry point. Therefore, the group velocity vector Vg4 points inward, indicating negative refraction. As a result, group velocity vector Vg4, illustrating the direction of wave propagation through the negative refractive material 140, is oriented perpendicular to, but toward from the center of, EFS4.

On the other hand, the third refractive material 130 is a positive refractive material similar to the first refractive material 110 and the second refractive material 120. Therefore, group velocity vector Vg3 is oriented perpendicular to and away from the center of EFS3, and illustrates the direction of wave propagation through the third refractive material 130. A second frequency line 135 illustrates a specific frequency at which group velocity vector Vg3 intersects EFS3. The second frequency line 135 is carried down to intersect with EFS4. Thus, group velocity vector Vg4 defines the direction of wave propagation through the negative refractive material 140 of a wave at the same frequency as the wave propagating through the third refractive material 130. The lower portion of FIG. 1B illustrates the two group velocity vectors Vg3 and Vg4 and the direction change that occurs at the boundary between the third refractive medium 130 and the negative refractive medium 140. The negative refraction can be seen by the negative angle from the surface normal for group velocity vector Vg4.

FIG. 2 illustrates focusing properties of electromagnetic radiation traveling through a material exhibiting a negative refractive index. In FIG. 2, a top view illustrates a slab of negative refractive material 140 with third refractive material 130 on opposite sides of the negative refractive material 140. Incident electromagnetic radiation beams have first directions 132 when they impinge on an incident surface 146 of the negative refractive material 140. The negative refractive property of negative refractive material 140 cause the electromagnetic radiation beams to deviate towards second directions 142 with a negative angle from the surface normal of the incident surface 146. As the electromagnetic radiation beams emit from an emitting surface 148 of the negative refractive material 140, they deviate towards third directions 134. As the electromagnetic radiation beams travel in the third direction 134, they converge at a focal point 136.

As stated earlier meta-materials according to particular embodiments of the present invention may comprise a composite media with a random arrangement of individual unit cells. In developing meta-materials, to achieve a meta-material exhibiting a negative refraction index, it may be desirable to combine two media together. One media primarily exhibits an electrical response to incident radiation, while the other media primarily exhibits a magnetic response to incident radiation.

By selecting the media appropriately, the electrical medium will have a frequency band over which its permittivity is negative and the magnetic medium will have a frequency band over which its permeability is negative.

In certain configurations, an interwoven array of conducting wires has been shown to form a magnetic medium having a frequency band with negative permeability. These configurations may be generally referred to as resonators. Resonators enable the creation of an effective magnetic response without having to use an inherently magnetic media. By generating local currents in response to an electromagnetic field, resonators may produce a response similar to what would occur in magnetic media, but at much higher frequencies. In general, these local currents may be generated by a non-continuous conducting path that substantially encloses a finite area and includes some form of capacitance. In other words, an element that includes a non-continuous conducting path nearly enclosing a finite area and further introduces capacitance into the circuit will have solenoidal currents induced in the conducting path. This element will exhibit at least one resonant frequency determined by the combination of the capacitance and the inductance associated with the current path and will exhibit the effective magnetic response due to the solenoidal currents.

A resonator with a size much smaller than a wavelength of interest may respond resonantly to that wavelength of interest. When responding resonantly, the resonator may exhibit negative permeability. Some representative resonators are illustrated in FIGS. 3A-3D. Each resonator has a dimension much smaller than the wavelength over which it responds resonantly.

FIG. 3A illustrates an exemplary split ring resonator pattern 210 for a conductive material. The split ring resonator pattern 210 includes concentric rings including an outer ring 216 and an inner ring 212, wherein the rings have a substantially circular pattern with an opening in the ring. The inner ring 212 has an opening on one side, while the outer ring 216 has an opening on the opposite side from the opening in the inner ring 212. The inner ring 212 has an inner ring width 214, the outer ring 216 has an outer ring width 218, and the two rings are separated by a gap 219.

Figure 3B:
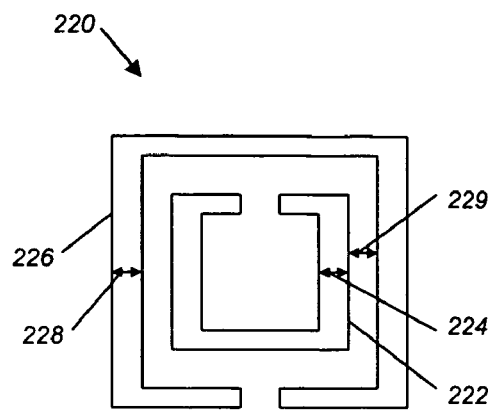
FIG. 3B illustrates a square split ring resonator pattern for a conductive material according to a particular embodiment of the invention.

FIG. 3B illustrates an exemplary square split ring resonator pattern 220 for a conductive material very similar to the split ring resonator pattern 210 of FIG. 3A, except that the concentric rings have a substantially square pattern. The inner ring 222 has an opening on one side, while the outer ring 226 has an opening on the opposite side from the opening in the inner ring 222. The inner ring 222 has an inner ring width 224, the outer ring 226 has an outer ring width 228, and the two rings are separated by a gap 229.

Figure 3C:
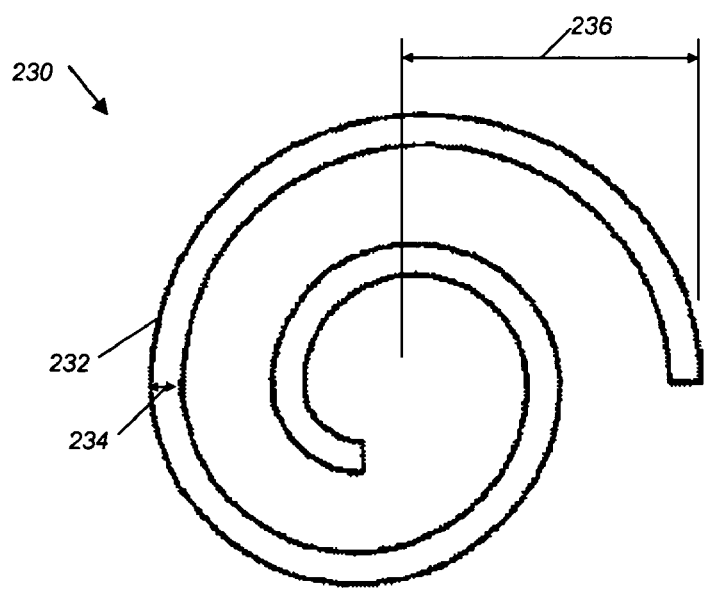
FIG. 3C illustrates a Swiss roll pattern for a conductive material according to a particular embodiment of the invention.

FIG. 3C shows an exemplary Swiss roll pattern 230 for a conductive material. The swiss roll pattern 230 includes a continuous, winding loop 232 having a width 234 and an outer radius 236. Generally, swiss roll patterns 230 may also be described by the number of turns made about a center point before reaching the outer radius 236.

FIG. 3D shows an exemplary L-shaped resonator pattern 240 for a conductive material. The L-shaped pattern includes four isolated L-shaped arms (242A, 242B, 242C, and 242D) with four-fold rotation symmetry. In the particular embodiment illustrated in FIG. 3D, the arms include a length (247) of about 550 nm, a width (246) of about 90 nm, and a thickness of about 100 nm. The gap (245) between each arm is about 45 nm. In this particular embodiment the conductive material is gold.

Excitation radiation incident on a resonator may result in a negative magnetic permeability for a given frequency range due to a resonant reaction of the conducting wire pattern. On the other hand, a thin and substantially straight wire of a conductive material (also referred to herein as a thin wire pattern) has been shown to form a negative permittivity over a frequency band of interest.

By combining the resonators with the thin wire pattern, a medium can be formed that exhibits both a negative permeability over a first frequency band and a negative permittivity over a second frequency band. In some configurations, the medium may be configured such that the first frequency band and the second frequency band include a region of overlap such that the medium exhibits both a negative permeability and a negative permittivity in the overlap region.

The conductive material for the split ring resonator pattern 210 (FIG. 3A), the square split ring resonator pattern 220 (FIG. 3B), the Swiss roll pattern 230 (FIG. 3C), the L-shaped pattern 240 (FIG. 3D), and the thin wire pattern 250 (FIGS. 4B and 5) may be any conductive material, such as, for example, a conducting metal.

The splits in the rings of the SRR allow the element to be resonant at wavelengths much larger than the diameter of the rings. The purpose of the inner ring (212 and 222) with a split oriented opposite to the split in the outer ring (216 and 226) is to increase the capacitance in the element, concentrating an electric field within the small gap (219 and 229) region between the rings and lowering the resonant frequency considerably.

FIGS. 3E and 3F illustrate another form of resonator. This resonator is a periodic hole array tri-layer or "fishnet" structure. In the representative embodiment shown in FIGS. 3E and 3F, a first fishnet 260 is formed on a first surface 302 of a substrate 300 (e.g., a dielectric layer) and a second fishnet 261 is formed on a second surface 304 of the substrate 300. First lines 252 include a width (253) of about 100 nm and second lines 254 running substantially perpendicular to the first lines 252 include a width of about 300 nm. In this embodiment, the pitch between adjacent first lines 252 and the pitch between adjacent second lines 254 is substantially the same (about 600 nm). The first lines and second lines form a single layer of conductive material with a periodic hole array pattern in the conductive material. This periodic hole array pattern exhibits both negative magnetic permeability and negative dielectric permittivity at substantially the same near-IR wavelength region based on the dimensions discussed for this embodiment. This results in a negative refractive index for the near-IR wavelength of interest. Of course, those of ordinary skill in the art will recognize that other dimensions for the fishnet pattern may be applied and may result in a negative refractive index for a different wavelength of interest.

Figure 4A:
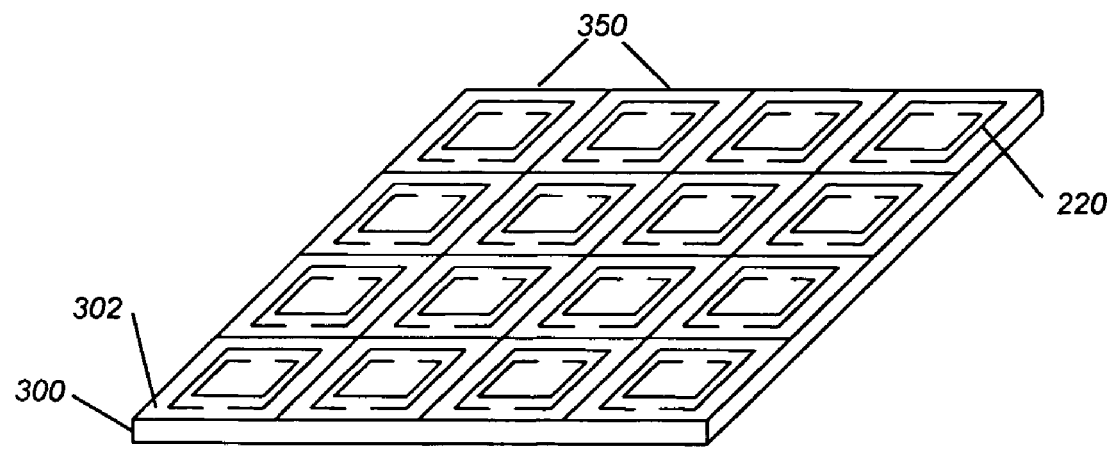
FIG. 4A is a three-dimensional view of a substrate bearing a square split ring resonator pattern on a first side according to a particular embodiment of the invention.
Figure 4B:
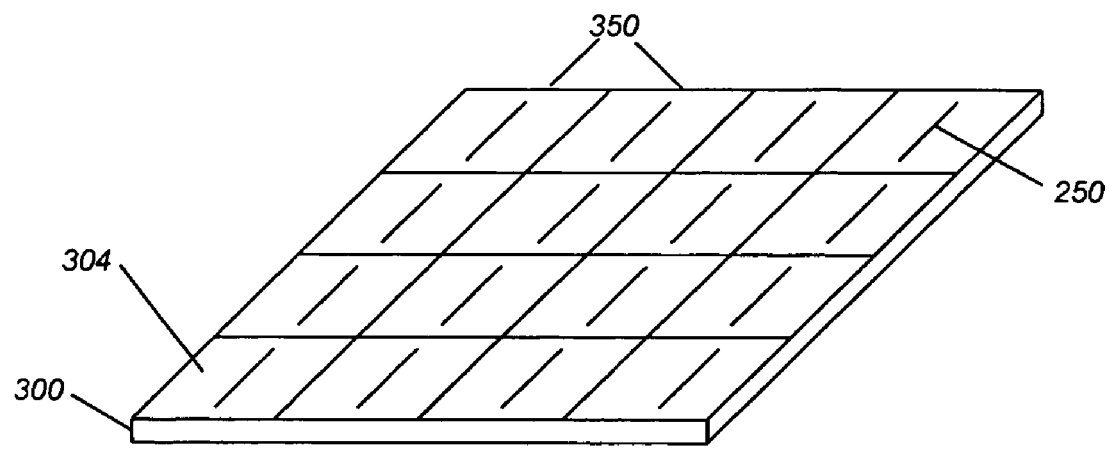
FIG. 4B is a three-dimensional view of the substrate of FIG. 4A bearing a thin wire pattern on a second side according to a particular embodiment of the invention.

FIG. 4A is a three-dimensional view of a substrate 300' bearing a plurality of unit cells 350. Each unit cell 350 includes square split ring resonator patterns 220 on a first surface 302. FIG. 4B is a three-dimensional view of the substrate 300' of FIG. 4A bearing a plurality of thin wire patterns 250 on a second surface 304 with at least one thin wire pattern 250 for each unit cell 350. The substrate 300 may be any supporting structure comprising a dielectric medium and having the ability to provide a sufficient thickness for separation between the resonator and the thin wire pattern 250, such as for example, semiconductor, circuit board material, glass, quartz, ceramics, and plastics such as polystyrene, and polycarbonate.

Figure 5:
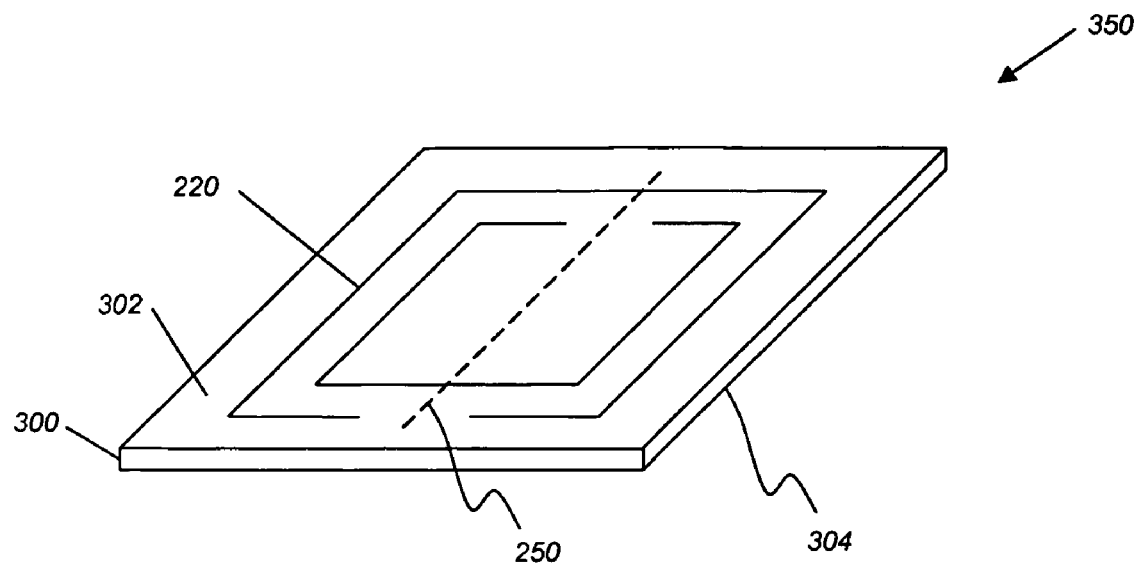
FIG. 5 is a three-dimensional view of a unit cell bearing a square split ring resonator pattern on one side and a thin wire pattern on the obverse side according to a particular embodiment of the invention.

FIG. 5 is a three-dimensional view of a single unit cell 350 bearing a square split ring resonator pattern 220 on the first surface 302 of the substrate 300 and a thin wire pattern 250 on the second surface 304 of the substrate 300.

Of course, FIGS. 4A, 4B, and 5 illustrate a square split ring resonator pattern 220 and thin wire pattern 350 on the substrate 300. Those of ordinary skill in the art will recognize that any of the resonator patterns may be used.

Each individual unit cell 350 may be a negative index material over a frequency band of interest. By way of example and not limitation, a negative effective magnetic permeability can be measured in a split ring resonator pattern 210 comprised of copper and having an inner ring width 214 and an outer ring width 218 of about 1.5 millimeters, an inner ring 212 radius of about 0.8 millimeters, a gap 219 between rings of about 0.2 millimeters, a wire thickness of about 0.4 millimeters, and a gap between a wire element 240 and the split ring resonator pattern 220 of about 0.4 millimeters. With these representative dimensions, the split ring resonator may have a resonance peak of about 4.85 Ghz.

Manipulating the dimensions and shape of these resonator patterns can change the electromagnetic properties of devices in which they are installed. In addition, the magnetic permeability of the structure may be modified by including ferromagnetic material inlaid inside a region bounded by the inner ring (212, 222) and the outer ring (216, 226) for the split ring resonator pattern 210 and the square split ring resonator pattern 220, or near the center of the swiss roll pattern 230.

In forming the array of unit cells 350, a suitable substrate 300 is selected and the resonator is formed on a first surface 302 of the substrate 300 and the thin wire pattern 250 is formed on the second surface 304 of the substrate 300. As is known to those of ordinary skill in the art, the pattern may be formed on the substrate 300 in a number of ways. For example, the conductive material may be deposited on the substrate 300 by thin film deposition, lamination of a copper sheet, or some other technique known by those ordinarily skilled in the art. Once the conductive materials have been deposited, the material not being used may be etched away using conventional micro-photolithography, etching, or other techniques. The resultant pattern may be any of the split ring resonator pattern 210, square split ring resonator pattern 220, the swiss roll pattern 230, or the thin wire pattern 250. After the patterns have been formed, the substrate 300 may be singulated to form each unit cell 350, using conventional techniques such as, for example, etching or sawing.

Figure 6:
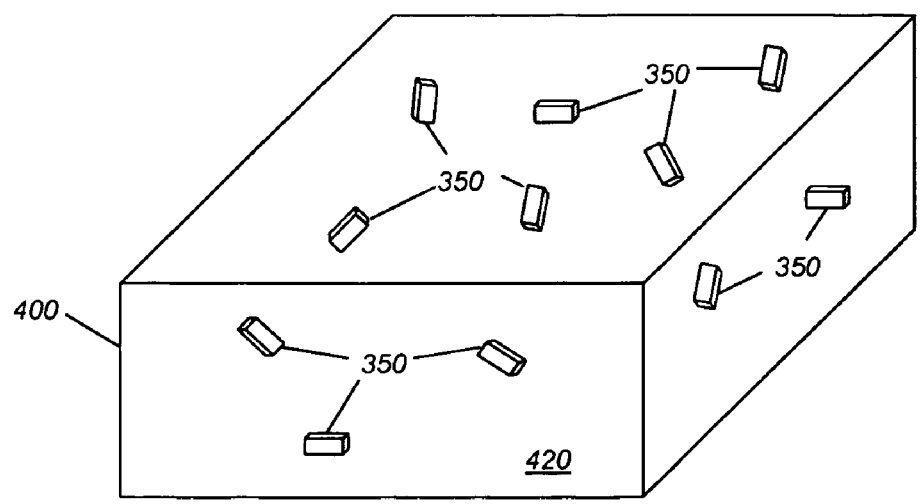
FIG. 6 is a three-dimensional view of bulk solution in a three-dimensional volume including a substantially random pattern of unit cells disposed therein according to a particular embodiment of the invention.

FIG. 6 is a three-dimensional view of bulk solution 420 in a three-dimensional volume 400 including a substantially random pattern of unit cells 350 disposed therein. The bulk solution 420 may be a non-conductive organic solvent such as, for example, methanol. If the unit cell 350 size is substantially smaller (e.g., 100-1000 times) than the wavelength of interest and with a relatively random distribution of the unit cells 350 in the bulk solution 420, the three-dimensional volume 400 may exhibit negative refractive properties similar to those for each individual unit cell 350. Consequently, a relatively large three-dimensional volume 400 of negative refractive material may be easily fabricated.

When the dimensions and spacing of these randomly distributed unit cells 350 included in the medium of the three-dimensional volume 400 are less than the wavelength of the incident radiation, the responding fields and currents can be considered as macroscopic averages, and the medium of the three-dimensional volume 400 may be treated as if it is relatively continuous.

In addition, gain may be introduced into the negative index material in the three-dimensional volume 400 by including elements such as, for example, Raman gain materials (e.g., rodamine-6G), erbium, semiconductor materials (e.g., $In_xGa_{1-x}As_yP_{1-y}$) or quantum dots in the bulk solution 420.

Returning to FIG. 2, the three-dimensional volume 400 (of FIG. 6) may be considered a negative refractive material 140 over a frequency band of interest. Consequently, the negative refractive material 140 may exhibit super-lensing properties over that frequency band of interest such that an incident radiation 132 directed toward the negative refractive material 140 may generate a focused radiation 134 at a focal location 136 on the other side of the negative index material 140 by a negative refraction of the incident radiation 132 in the negative index material 140.

Although the foregoing description contains many specifics, these are not to be construed as limiting the scope of the present invention, but merely as providing certain exemplary embodiments. Similarly, other embodiments of the invention can be devised which do not depart from the spirit or scope of the present invention. The scope of the invention is, therefore, indicated and limited only by the appended claims and their legal equivalents, rather than by the foregoing description. All additions, deletions, and modifications to the invention, as disclosed herein, which fall within the meaning and scope of the claims, are encompassed by the present invention.

What is claimed is:

1. A negative index material, comprising:
   a plurality of unit cells, each unit cell comprising a resonator formed on a substrate, wherein the resonator exhibits a negative permeability and a negative permittivity over a frequency band of interest; and
   a three-dimensional volume including a bulk solution wherein the plurality of unit cells is disposed in the bulk solution to form a substantially random pattern of unit cells to produce a negative effective permeability and a negative effective permittivity over the frequency band of interest for the three-dimensional volume.

2. The negative index material of claim 1, wherein the resonator of the unit cells comprises:
   a resonator structure formed on a first surface of the substrate and including conductive material formed in a pattern selected from the group consisting of a split ring resonator pattern, a square split ring resonator pattern, a Swiss roll pattern, and a L-shaped pattern; and
   a thin wire pattern formed on a second surface of the substrate.

3. The negative index material of claim 1, wherein the resonator of the unit cells comprises:
   a periodic hole array pattern of a conductive material formed on a first surface of the substrate; and
   another periodic hole array pattern of a conductive material formed on a second surface of the substrate.

4. The negative index material of claim 1, wherein the substrate comprises a material selected from the group consisting of a semiconductor, circuit board material, glass, quartz, ceramics, polystyrene, and polycarbonate.

5. The negative index material of claim 1, wherein the bulk solution comprises a non-conductive organic solvent.

6. The negative index material of claim 1 wherein the bulk solution further comprises a gain material.

7. The negative index material of claim 6, wherein the gain material is selected from the group consisting of Raman gain materials, erbium, semiconductor materials, and quantum dots.

8. A method of forming a negative index material, comprising:
   forming unit cells on a substrate, each unit cell comprising a resonator exhibiting a negative permeability and a negative permittivity over a frequency band of interest;
   singulating the unit cells;
   disposing the unit cells into a three-dimensional volume including a bulk solution to form a substantially random pattern of unit cells, wherein the substantially random pattern of unit cells produces a negative effective permeability and a negative effective permittivity over the frequency band of interest for the three-dimensional volume.

9. The method of claim 8, wherein forming the unit cells comprises:
   forming a resonator structure on a first surface of the substrate of a conductive material in a pattern selected from the group consisting of a split ring resonator pattern, a square split ring resonator pattern, a swiss roll pattern, and a L-shaped pattern; and
   forming a thin wire pattern on a second surface of the substrate.

10. The method of claim 8, wherein forming the unit cells comprises:
    forming a periodic hole array pattern of a conductive material on a first surface of the substrate; and
    forming another periodic hole array pattern of a conductive material on a second surface of the substrate.

11. The method of claim 8, wherein supplying the substrate comprises supplying a material selected from the group consisting of semiconductor, circuit board material, glass, quartz, ceramics, polystyrene, and polycarbonate.

12. The method of claim 8, wherein the bulk solution comprises a non-conductive organic solvent.

13. The method of claim 8, wherein the bulk solution further comprises a gain material.

14. The method of claim 13, wherein the gain material is selected from the group consisting of Raman gain materials, erbium, semiconductor materials, and quantum dots.

15. A method of focusing radiation, comprising:
    providing a negative index material, comprising:
       a plurality of unit cells, each unit cell comprising a resonator formed on a substrate, wherein the resonator exhibits a negative permeability and a negative permittivity over a frequency band of interest; and
       a three-dimensional volume including a bulk solution wherein the plurality of unit cells is disposed in the bulk solution to form a substantially random pattern of unit cells to produce a negative effective permeability and a negative effective permittivity over the frequency band of interest for the three-dimensional volume;
    directing an incident radiation at an incident surface of the negative index material; and
    generating a focused radiation at a focal location outside the negative index material by a negative refraction of the incident radiation in the negative index material.

16. The method of claim 15, wherein the resonator of the unit cells comprises:
    a resonator structure formed on a first surface and including conductive material formed in a pattern selected from the group consisting of a split ring resonator pattern, a square split ring resonator pattern, a swiss roll pattern, and a L-shaped pattern; and
    a thin wire pattern formed on a second surface of the substrate.

17. The method of claim 15, wherein the resonator of the unit cells comprises:
    a periodic hole array pattern of a conductive material formed on a first surface of the substrate; and
    another periodic hole array pattern of a conductive material formed on a second surface of the substrate.

18. The method of claim 15, wherein the substrate comprises a material selected from the group consisting of a semiconductor, circuit board material, glass, quartz, ceramics, polystyrene, and polycarbonate.

19. The method of claim 15, wherein the bulk solution comprises a non-conductive organic solvent.

20. The method of claim 15, wherein the bulk solution further comprises a gain material.

21. The method of claim 20, wherein the gain material is selected from the group consisting of Raman gain materials, erbium, semiconductor materials, and quantum dots.

* * * * *

UNITED STATES PATENT AND TRADEMARK OFFICE
CERTIFICATE OF CORRECTION

| | | |
|---|---|---|
| PATENT NO. | : 7,593,170 B2 | Page 1 of 1 |
| APPLICATION NO. | : 11/584320 | |
| DATED | : September 22, 2009 | |
| INVENTOR(S) | : Wei Wu et al. | |

It is certified that error appears in the above-identified patent and that said Letters Patent is hereby corrected as shown below:

In column 9, line 35, in Claim 6, delete "claim 1" and insert -- claim 1, --, therefor.

Signed and Sealed this
Eighteenth Day of January, 2011

David J. Kappos
*Director of the United States Patent and Trademark Office*